Oct. 21, 1969  O. J. LINDELL  3,473,211
METHOD OF FORMING TEETH ON A TUBULAR MEMBER
Filed Sept. 16, 1966  3 Sheets-Sheet 1
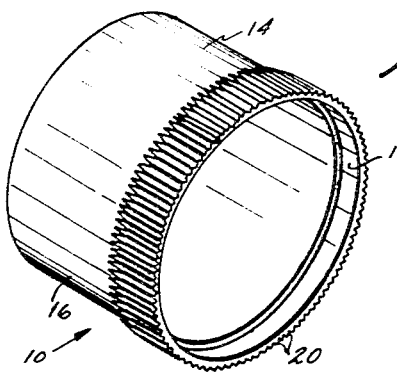
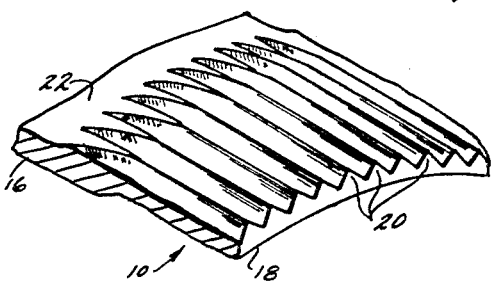
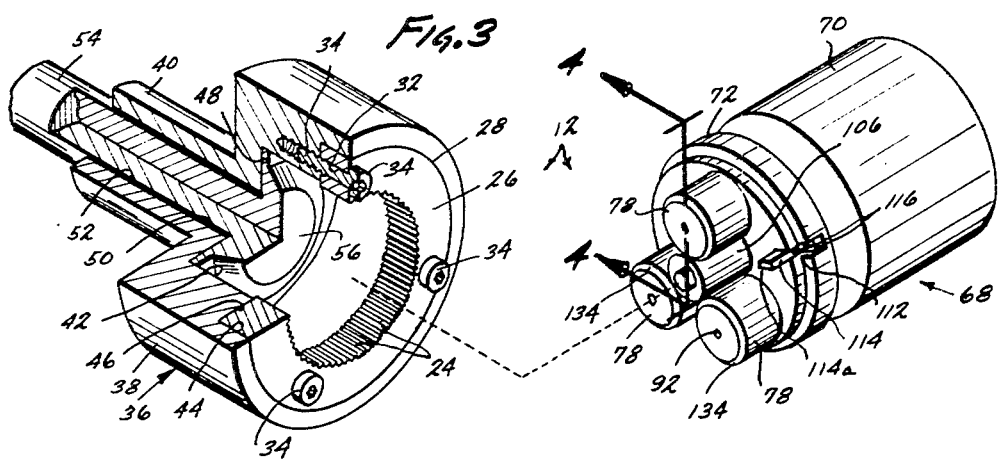
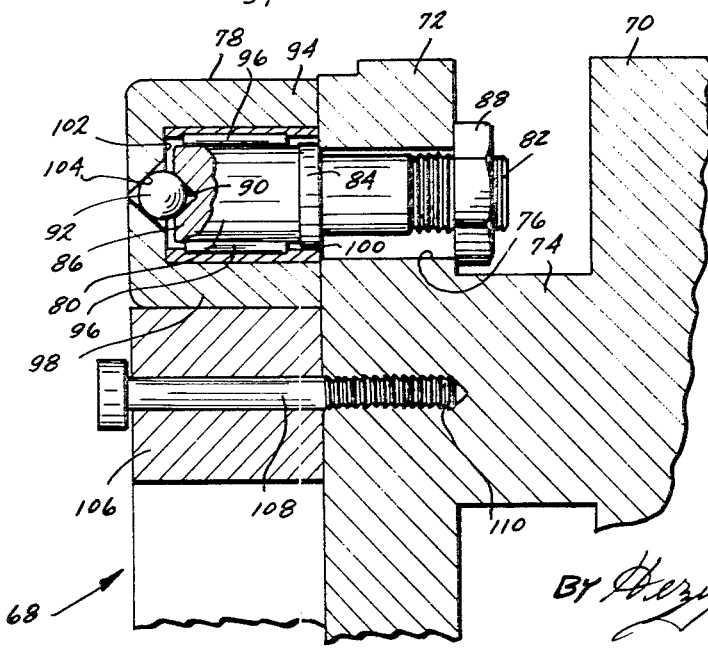
INVENTOR
OSWALD J. LINDELL
BY Herzig, Walsh & Blackham
ATTORNEYS Oct. 21, 1969   O. J. LINDELL   3,473,211
METHOD OF FORMING TEETH ON A TUBULAR MEMBER
Filed Sept. 16, 1966   3 Sheets-Sheet 2
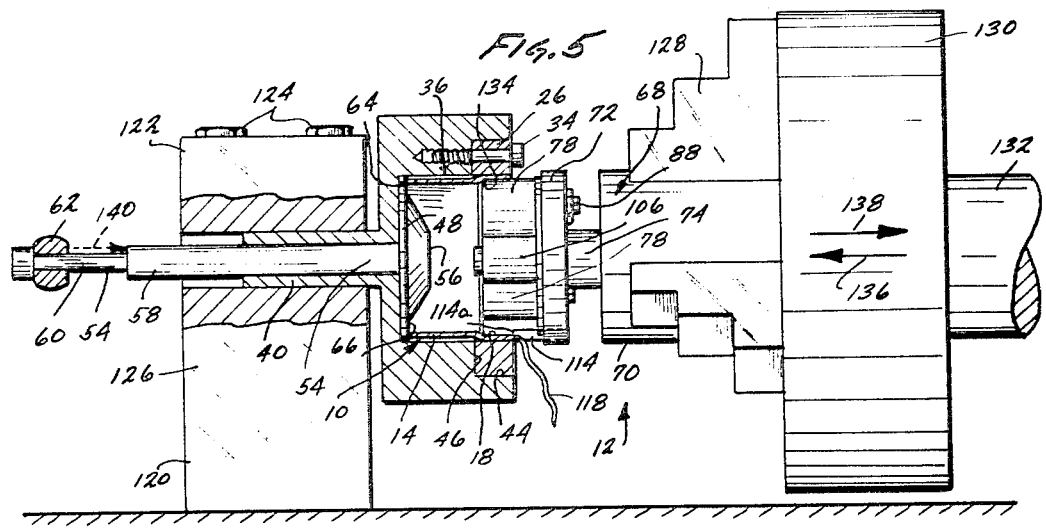
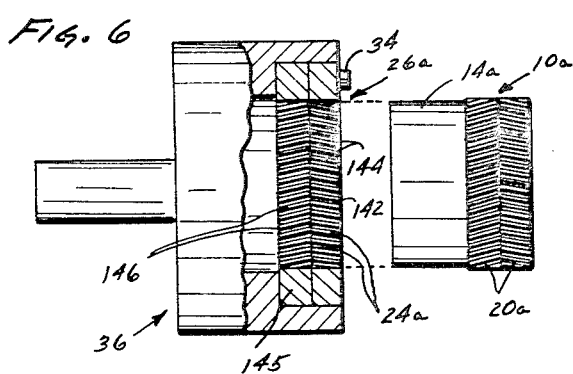
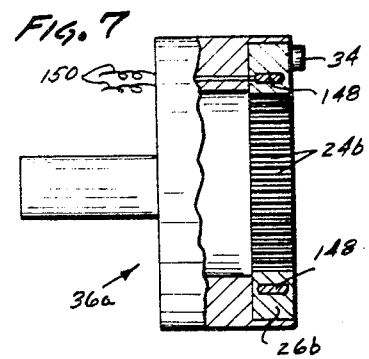
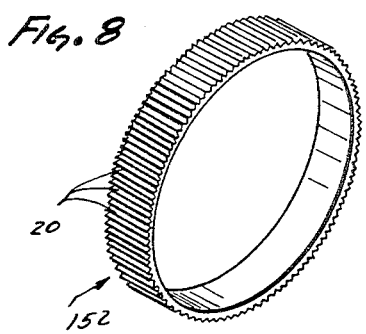
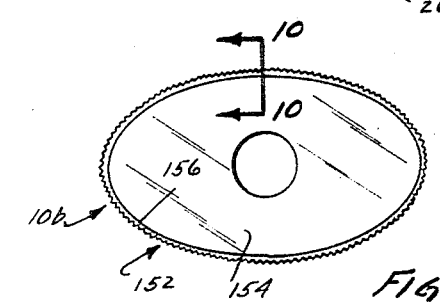
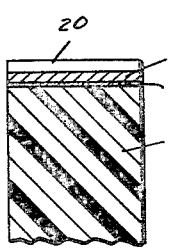
INVENTOR
OSWALD J. LINDELL
BY Herzig, Walsh & Blackham
ATTORNEYS Oct. 21, 1969     O. J. LINDELL     3,473,211
METHOD OF FORMING TEETH ON A TUBULAR MEMBER
Filed Sept. 16, 1966     3 Sheets-Sheet 3
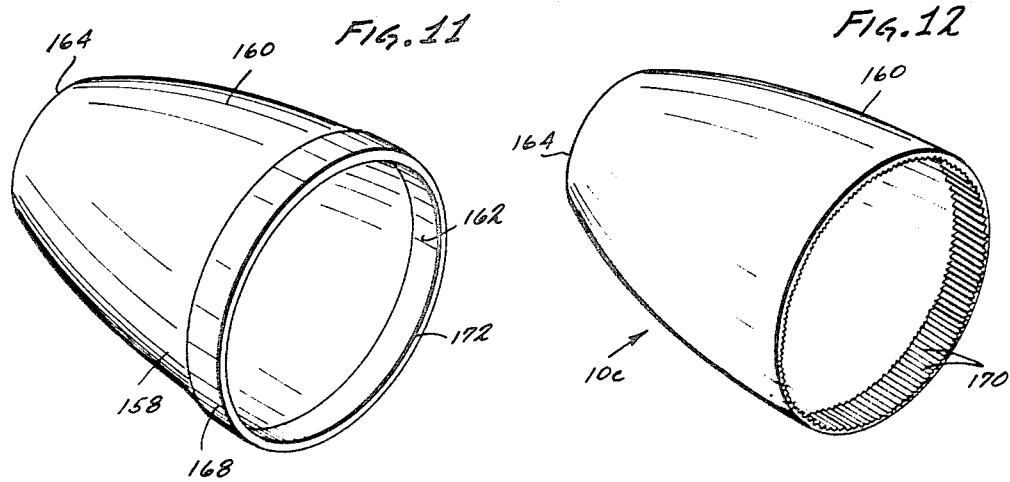
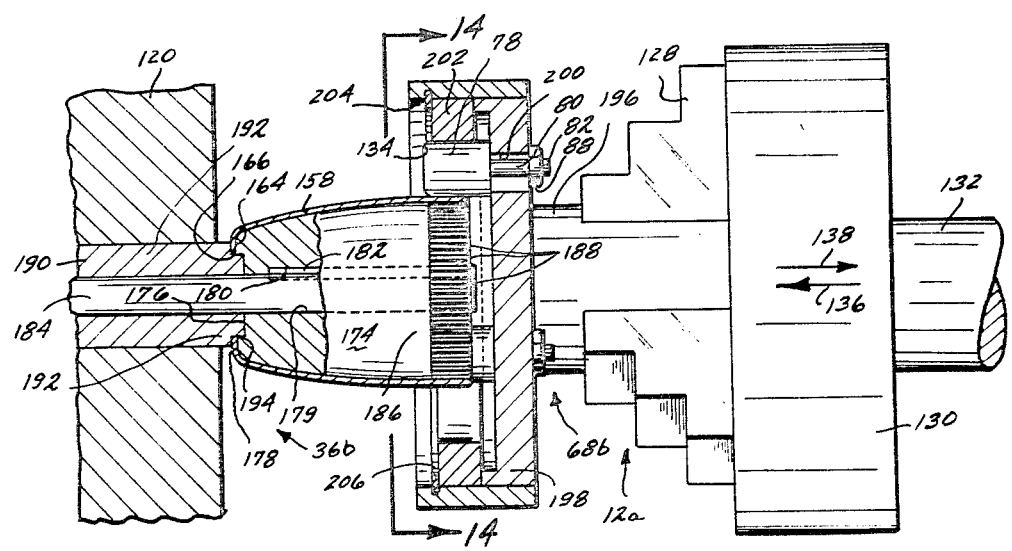
INVENTOR
OSWALD J. LINDELL
BY Herzig, Walsh & Blackham
ATTORNEYS 3,473,211
METHOD OF FORMING TEETH ON A
TUBULAR MEMBER
Oswald J. Lindell, 9238 Birdvale Drive,
Downey, Calif. 90242
Filed Sept. 16, 1966, Ser. No. 579,957
Int. Cl. B21h 5/00; B23p 15/14; B29d 15/00
U.S. Cl. 29—159.2                                    2 Claims

ABSTRACT OF THE DISCLOSURE

A method of forming teeth on a tubular member. The method comprises the steps of forming teeth at one end of a tubular member, severing said teeth from said tubular member so as to form a band with teeth thereon, fabricating a hub having a circumference substantially the same as the internal circumference of said band, and mounting said band on said hub in encompassing relationship therewith.

---

There are a number of situations where it is desirable to provide fine teeth about either the outer periphery or the inner periphery of a tubular metallic member. Such teeth have been formed on a tubular member employing molding techniques. Alternatively, the teeth have been formed on the tubular member employing metal cutting techniques. Knurling techniques have also been suggested. While generally satisfactory, each of these techniques has certain disadvantages.

One disadvantage with the molding technique resides in the fact that it is rather difficult to mold fine teeth having good sharp points.

One disadvantage with metal cutting techniques resides in the fact that such techniques are too expensive to use on low-cost items.

A disadvantage with the knurling technique resides in the face that a knurling tool quite often fractures the material. Another disadvantage resides in the fact that it is virtually impossible to form the correct number of teeth on the tubular member because of the difficulty of designing a knurling tool which will end correctly at the point of beginning.

A further problem involved in the manufacture of gears on tubular members resides in manufacturing the entire tubular member out of metal ideally suited for gear formation. It is therefore among the primary objects of this invention to provide a method of forming teeth on a tubular member by first forming teeth on a band of metal ideally suited for gear formation and then placing this band in encompassing relation around a tubular member whose circumference is substantially the same as the internal circumference of the band. In this way a tubular member may be manufactured with gears on one end in which the metal selected for the tubular member is not necessarily suitable to have gears formed thereon by conventional means.

In view of the foregoing factors and conditions characteristic of methods of forming teeth on a tubular member, it is also among the objects of the present invention to provide a new and useful method of forming teeth on a tubular member not subject to the disadvantages enumerated above including tooling especially designed for forming teeth on a tubular member efficiently, safely and expeditiously.

Yet another object of the present invention is to provide a new and useful method of forming teeth on a tubular member which includes the steps of compressing the encompassing side wall of the tubular member into a predetermined number of teeth formed in a master die and axially extruding a portion of the material from the tubular member along the roots of the teeth in the die.

A further object of the present invention is to provide new and useful tooling for forming teeth about the periphery of a tubular member.

According to the present invention, a first set of tooling is provided for forming teeth on the outer periphery of a tubular member employing the method of the present invention to produce the article of the present invention.

A first set of tooling includes a master die in the shape of an annulus having internal teeth formed on the inner periphery thereof. This annulus may be bolted into a fixture adapted to support the annulus in the tail stock of a lathe. The fixture includes an internal cavity adapted to receive a metal tubular member upon which it is desired to form external teeth extending about the outer periphery thereof. The tubular member bottoms out in the cavity in such a manner that one end of the tubular member will be disposed within the annulus in operative association with the teeth formed thereon.

The first set of tooling also includes a rotatable member which may be mounted in the head stock of the lathe and rotated thereby. This rotatable member carries a pair of individually rotatable rolls having a combined circumference slightly larger than the internal circumference of the tubular member. The individual rolls are chamfered to facilitate engaging them into the tubular member and are maintained in spaced relation by an internal roller rotatably mounted between them. The tail stock may then be moved axially into engagement with the rolls during rotation of the rotatable member. As the tail stock moves the tubular member axially onto the rollers, a portion of the side wall of the tubular member is worked into the teeth on the die so that they will be reproduced as external teeth on the tubular member. Working of the material from the tubular member into the die teeth is continued until the tubular member extrudes axially from the roots of the teeth on the die. The rotary member includes a cutter which automatically severs the extruded portion. The tail stock may then be reversed while the rotatable member continues rotating until the rollers have been withdrawn from the tubular member. Alternatively, the tail stock may remain fixed while the head stock is moved toward the tail stock.

The fixture which carries the die includes a plunger which is reciprocably mounted therein and which includes a head lying at the base of the fixture cavity in contact with the tubular member. This plunger may be used to push the tubular member from the cavity after the teeth have been formed on the tubular member. The die may carry straight teeth or, alternatively, a pair of dies having angular teeth forming a herringbone design may be employed to inexpensively form herringbone gears. After a herringbone gear has been formed, the two dies are removed so that the tubular member may be removed.

The second set of tooling is designed for forming gears on the inner periphery of a tubular member and includes a die having teeth formed about the outer periphery thereof. The die is carried by a fixture which may be placed in the tail stock of a lathe with a tubular member encompassing the fixture and having a portion overlying the external teeth. The second set of tooling also includes a rotatable member which may be mounted in the head stock of a lathe for rotation thereby. This rotatable member includes a plurality of rollers adapted to encompass the tubular member on the fixture when the tail stock is moved axially toward the head stock. The rollers on the rotatable member include chamfered ends and are rotatably mounted on the rotatable member. An annular ring is installed on the rotatable member in encompassing relation with the rollers and is napped into position on the rotatable member in such a manner that the ring is free to rotate during rotation of the rotatable member and maintains the rollers in firm engagement with the tubular member. The inner circle defined by the rollers is smaller than the outer periphery of the tubular member so that the rollers will compress the outer periphery of the tubular member into the teeth provided on the fixture. Working of the metal into the teeth is continued until the tubular member extrudes axially from the roots of the external teeth provided on the die member. The tail stock may then be reversed and moved away from the rotatable member while rotation thereof is continued. Alternatively, the tail stock may remain fixed in position while the head stock is moved toward and away from the tail stock.

If desired, the teeth which have been formed on the tubular member may be severed therefrom in the form of a collar which may be adhesively secured about the periphery of cylindrical or elliptically shaped members forming teeth thereon.

The features of the present invention which are believed to be novel are set forth with particularity in the appended claims. The present invention, both as to its organization and manner of operation together with further objects and advantages thereof, may best be understood by reference to the following description, taken in connection with the accompanying drawings in which like reference characters refer to like elements in the several views:

In the drawings:

FIGURE 1 is a perspective view of a tubular member constituting a first embodiment of an article of the present invention which may be manufactured in accordance with the method of the present invention employing the apparatus of the present invention;

FIGURE 2 is an enlarged, partial perspective view of the toothed portion of the tubular member shown in FIG. 1;

FIGURE 3 is an exploded perspective view, with parts broken away to show internal construction, of a first embodiment of the apparatus of the present invention;

FIGURE 4 is an enlarged, cross-sectional view taken along line 4—4 of FIG. 3;

FIGURE 5 is an enlarged elevational view, with parts broken away to show internal construction, of the apparatus of FIG. 3 in its operating environment;

FIGURE 6 is an exploded elevational view, with parts broken away to show internal construction, showing somewhat schematically a combination of a modified product of the present invention and a modified form of the apparatus of FIG. 3;

FIGURE 7 is an elevational view, with parts broken away to show internal construction, of a second modified form of the apparatus of FIG. 3;

FIGURE 8 is a perspective view of the toothed portion of the tubular member of FIG. 1 after it has been severed from the tubular member;

FIGURE 9 is a cross-sectional view of an elliptical gear formed by taking the toothed portion of FIG. 8 and affixing it to an elliptical hub;

FIGURE 10 is an enlarged, partial cross-sectional view, taken along line 10—10 of FIG. 9;

FIGURE 11 is a perspective view of a tubular member which may be provided with internal teeth to form a modified article of the present invention by employing the method of the present invention in a second embodiment of the apparatus of the present invention;

FIGURE 12 is a perspective view similar to FIG. 11 showing the tubular member after internal teeth have been formed thereon in accordance with the method of the present invention using the apparatus of the present invention;

FIGURE 13 is a reduced elevational view, with parts broken away to show internal construction, of a second embodiment of the apparatus of the present invention in operative association with the tubular member of FIG. 11; and FIGURE 14 is a cross-sectional view taken along line 14—14 of FIG. 13.

Referring again to the drawings and particularly to FIGS. 1–5, a first form of a product of the present invention, generally designated 10, may be made by using a first embodiment of an apparatus of the present invention, generally designated 12, using the method of the present invention. The product 10 includes a tubular, metallic member 14 having an encompassing side wall 16 and an open end 18. A plurality of axially-extending teeth 20 may be formed about the outer periphery 22 of the tubular member 14 by radially expanding the open end 18 against a plurality of internal teeth 24 provided in a die member 26.

The die member 26 comprises an annulus having an outer periphery 28 and an inner periphery 30 and is provided with a plurality of bolt holes 32 through which associated cap screws 34 may pass to affix the die member 26 to a fixture 36.

The fixture 36 includes a cylindrical head 38 and a cylindrical tail piece 40. The head 38 is provided with a cavity or recess 42 which is counterbored, as indicated at 44, to form an annular shoulder 46 which accommodates the die member 26. The diameter of the cavity 42 is slightly larger than the diameter of the tubular member 14 so that it may be slid into position in the head 38 with a close fit.

The head 38 includes a bottom wall 48 which is provided with an aperture 50 in alignment with a bore 52 provided in the tail piece 40. A ram 54 having a frustoconical head 56 and a shank 58 is reciprocably mounted in the bore 52 and includes a reduced-diameter portion 60 which is provided with a slidable hammer 62. When the tubular member 14 is in position within the cavity 42, as shown in FIG. 5, the end 60 thereof, which is remote from the open end 18, seats on an angular flange 66 provided on the head 56. The ram 54 may be employed to remove the tubular member 14 from the cavity 42 after the teeth 20 have been formed on the member 14, in a manner to be hereinafter described, by sliding the hammer 62 to the right, as viewed in FIG. 5, forcing the ram 54 to the right.

The apparatus 12 includes a rotatable member 68 having a shank portion 70 which is connected to a head 72 by a fixed shaft 74. The head 72 is provided with a plurality of slots, like the one shown at 76 in FIG. 4, in each of which a roller 78 is adjustably mounted. Each roller 78 includes a spindle 80 (FIG. 4) having an externally threaded end 82, an enlarged, intermediate portion 84 and a counterbored end 86. A nut 88 may be threaded onto the externally threaded end 82 and tightened against the head 72 bringing the enlarged, intermediate portion 84 into firm engagement therewith for clamping the spindle 80 within an associated slots 76. The counterbored end 86 is provided with a counterbore 90 in which a ball bear 92 is seated forming a thrust bearing for a roller member 94 rotatably mounted on the end 86 of spindle 80 by a bearing assembly 96. The roller 94 includes an encompassing side wall 98, an open end 100 and a closed bottom wall 102. The bottom wall 102 is provided with a counterbore 104 receiving the ball bearing 92. The rollers 78 are positioned on the head 72 in such a manner that a circle inscribed about the rollers will have a diameter which is approximately 00.020 inch greater than the internal diameter of the tubular member 14. The rollers 78 are maintained in this position under the force exerted thereon by the tubular member 14, during an operation to be hereinafter described, by a central roller 106 which is rotatably mounted between rollers 78 on a stud 108 having a threaded end 110 threadedly engaging the head 72.

The head 72 is also provided with a peripheral slot 112 in which a cut-off knife 114 is mounted by suitable rivet means 116. The knife 114 trims off extruded material 118 (FIG. 5) which extrudes from the tubular member 14 during the formation of the teeth 20 thereon.

In use, the member 36 is mounted in a fixed tail stock 120 on a lathe, or the like, by clamping the tail piece 40 therein. The tail piece 120 includes a removable cap 122 which may be clamped against the tail piece 40 by tightening cap screws 124 carried by the cap 122 and threadedly engaging the base portion 126 of tail stock 120.

The member 68 may be clamped in a chuck 128 provided on a rotatable drive 130 which is rotated by an input shaft 132 and which is adapted to be moved laterally into engagement with the tubular member 14 during rotation of the head 72 by the drive 130.

Entry into the tubular member 14 is facilitated by providing a chamfer 134 on the leading end of each roller 78. The rollers 78 work the metal from the side wall 16 into the die 26 progressively as the rollers are moved axially in the direction of arrow 136 (FIG. 5) during rotation of the head 72 until the extrusion 118 appears. At this time, the operator of the apparatus 12 is assured that the teeth 20 are formed to the full depth of the teeth 24. The drive 130 may then be moved in the direction of arrow 138 to withdraw the rollers 78 from the tubular member 14. The hammer 62 may then be slid in the direction of arrow 140 on the reduced diameter portion 60 of member 58 to push the tubular member 14 out of the cavity 42.

The knife 114 includes an end 114a engageable with the die 26 when the rollers 78 have penetrated the tubular member 14 to a sufficient depth axially, as indicated by the appearance of the extruded portion 118. Engagement of the end 114a of knife 114 with the die 26 shears the extruded portion 118 away from the tubular member 14. The drive 130 may be stopped automatically when the end 114a engages die 26 by conventional means, not shown.

Referring now more in particular to FIG. 6, a modified product of the present invention, generally designated 10a, includes a tubular member 14a which is provided with herringbone teeth 20a formed thereon by working the material of the tubular member 14a into herringbone teeth 24a provided in a master die means 26a which includes a first die member 142 having teeth 144 constituting one half of a herringbone gear and a second die half 144 having teeth 146 constituting the other half of a herringbone gear. The die halves 142 and 146 may be retained in the fixture 36 by the bolts 34. A blank tubular member 14a may then be placed in the fixture 36 and operated upon by the rollers 78 to work the material of the tubular member 14a into the teeth 24a. The bolts 34 may then be removed so that the tubular member 14a may be removed by using the ram 54 to remove the tubular member 14a together with the die means 26a.

Referring now to FIG. 7, a modified fixture 36a is shown which may be identical to the fixture 36 shown in FIG. 3 except that the die member 26 shown in FIG. 3 is modified, as indicated at 26b in FIG. 7, to include a heating element 148 for heating the portion of the tubular member 14 which is worked into the teeth 24b on the die member 26b. Such heating may be advantageous when the tubular member 14 is made from a hard metal which will not readily work into the teeth 24b without being heated a predetermined amount. The die member 26b is retained in the member 36a by the bolts 34 used to retain the die member 26 in the member 36. Current may be supplied to the heating element 148 through electrical leads 150.

Referring now to FIGS. 8–10, a circular band 152, which may be severed from the tubular member 14 shown in FIG. 1, includes the teeth 20 previously described in connection with FIG. 1 and constitutes a metal ring gear which may be attached to a suitable base member, such as a plastic hub or the like. As herein shown for purposes of illustration, but not of limitation, the band 152 has been attached to an elliptical base or hub 154 by an adhesive wellment 156. The combination of the band 152 and the elliptical hub 154 constitutes a second modified product of the present invention and is generally designated 10b.

Referring now to FIGS. 11–14, a third embodiment of the product of the present invention, generally designated 10c, may be made from a metal cup 158 having an encompassing side wall 160, an open top 162 and a tapered bottom wall 164. The bottom wall 164 is provided with an aperture 166 and a raised bead 168 encompasses the side wall 160 adjacent the open top 162.

A plurality of internal teeth 170 may be formed on the inner periphery 172 of the member 158 by employing a set of tooling 12a constituting a second embodiment of the apparatus of the present invention. The tooling 12a includes a first fixture 36b and a second fixture 68b. The fixture 36b includes a body portion 174 which is shaped and dimensioned to fit inside the member 158 with close tolerance in such a manner that a counterbore 176 provided in the end wall 178 of member 174, will communicate with the aperture 166 in the bottom wall 164 of the member 158. The member 174 is provided with a longitudinal bore 179 which is slotted, as indicated at 180, to receive a key 182 for non-rotatably connecting the member 174 to a shaft 184. The member 174 also includes an end 186 which is provided with external teeth 188 encompassing the end 186.

The shaft 184 may be clamped in the tail stock 120 by clamping elements 190 which encompass the shaft 184 and which include ends 192 each provided with one-half of a reduced diameter portion 194 engageable in the counterbore 176 when the body portion 174 and the member 158 are slid onto the shaft 184 to the position shown in FIG. 13. The key 182 may then be inserted into the slot 180 to lock the body portion 174 to the shaft 184.

The fixture 68b includes a spindle 196 for mounting the member 68b in the chuck 128 of the drive 130, previously described for rotation thereby. The fixture 68b also includes a head 198 which is provided with a plurality of slots, like the one shown at 100, for receiving the spindles 80 on the rollers 78 previously described. The spindles 80 may be positioned within slots 200 and retained in position by tightening the nuts 88 on the externally threaded ends 82 of associated spindles 80. The rollers 78 are maintained in a circular pattern having an inner circumference of approximately 00.020 inch less than the outer circumference of the bead 168 and are retained in this position by a sliding ring 202 which is retained in position within a counterbored portion 204 of the head 198 by a retainer ring 206.

In use, the drive 130 may be moved in the direction of arrow 136 while being rotated at a suitable angular velocity and worked onto the member 158 by engaging the chamfered portion 134 of the rollers 78 onto the bead 168 and continuing the movement of the drive 130 in the direction of arrow 136 so that the rollers 78 will work the material from the bead 168 into the external teeth 138, thereby forming the teeth 170 on the member 158. The travel of the drive 130 in the direction of arrow 136 may be interrupted when the rollers 78 have worked the material form bead 168 into the teeth 188 sufficiently to form the teeth 170 by conventional, automatic lathe stop means, not shows.

A few examples of the method of the present invention are as follows:

EXAMPLE I

A T-4 aluminum tubular member having a 00.040 inch wall thickness was placed in the recess 42 in the fixture 36. The size of the tubular member was such that it bottomed out on the flange 66 at one end and remained flush with the outer face of the die 26 at its other end. The material from the tubular member was then worked into the teeth 24 on the die 26 by moving the rollers 78 axially toward the fixture 36 while rotating the head 72 at approximately 300 r.p.m. under sufficient pressure that an axial extrusion of the material from the tubular member extended exteriorly of the die member 26. This extrusion was then severed by the knife 114 and the rollers 76 were removed from the tubular member by moving them axially away from the fixture 36 while continuing rotation of the head 72. The tubular member was then removed from the cavity 42 by actuating the ram 54. The tubular member was provided with 192 teeth on a 2¼ inch pitch diameter. The teeth had a total height of 00.028 inch.

EXAMPLE II

A tubular member may be provided with teeth as set forth in the previous example. The teeth may then be severed from the tubular member in the form of a circular band.

An elliptical hub may then be fabricated having an outside circumference approximately equal to the inside circumference of the band. The band may then be deformed to follow the shape of the elliptical hub and placed thereon in encompassing relationship therewith.

EXAMPLE III

An elliptical gear may be made in accordance with the steps in Example II except that an adhesive coating may be placed about the periphery of the elliptical hub before the band is placed thereon.

EXAMPLE IV

A tubular member may be provided with teeth in accordance with the method of Example I except that two dies may be used with each die half containing one half of the teeth foming a herringbone gear. After the teeth are formed, the tubular member may be removed from the cavity 42 by unfastening the die halves so that they will slide out of the fixture together with the tubular member.

EXAMPLE V

Teeth may be formed on a steel tubular member in accordance with the method of Example I by adding a step of heating the die member sufficiently to soften the tubular member in the area of the teeth 24 before the material of the tubular member is worked thereinto.

EXAMPLE VI

Teeth may be formed on the inner wall of a metal tubular member by inserting an externally toothed member into the tubular member and working the material from the tubular member into the external teeth on the externally-toothed member by engaging the outer periphery of the tubular member with a plurality of rollers arranged in a circular pattern and revolving the rollers about the periphery of the tubular member while exerting sufficient compressive force thereon to work the material into the teeth on the externally-toothed member.

While the particular apparatus for, method of and article produced by forming teeth on a tubular member herein shown and described in detail are fully capable of attaining the objects and providing the advantages hereinbefore stated, it is to be understood that they are merely illustrative of the presently preferred embodiments of the invention and that no limitations are intended to the details of construction, design or method steps herein shown and described other than as defined in the appended claims.

What is claimed is:

1. A method of forming teeth on a tubular member comprising the steps of:
    placing the tubular member in a die having teeth provided thereon; and
    radially working the tubular member into engagement with the die with sufficient pressure to work the material of the tubular member into the teeth on the die to the full depth of each die tooth including the steps of severing the teeth from said tubular member after they have been formed thereon to form a circular band, fabricating a hub having a circumference substantially the same as the internal circumference of said band and mounting said band on said hub in encompassing relationship therewith.

2. A method of forming teeth on a tubular member comprising the steps of:
    placing the tubular member in a die having teeth provided thereon; and
    radially working the tubular member into engagement with the die with sufficient pressure to work the material of the tubular member into the teeth on the die to the full depth of each die tooth including the steps of severing said teeth from said tubular member after they have been formed thereon to form an elliptical band, fabricating an elliptically shaped hub having a circumference substantially the same as the internal circumference of said band and mounting said band on said hub in encompassing relationship therewith.

References Cited

UNITED STATES PATENTS

| | | | |
|---|---|---|---|
| 1,734,903 | 11/1929 | Hanson | 72—105 X |
| 2,024,803 | 12/1935 | Nelson | 72—105 |
| 2,054,182 | 9/1936 | Unke | 72—106 |
| 2,906,147 | 9/1959 | Pelphrey | 72—105 |
| 3,121,252 | 2/1964 | McCardell | 29—159.2 X |
| 3,226,809 | 1/1966 | Perrin | 29—159.2 |

THOMAS H. EAGER, Primary Examiner

U.S. Cl. X.R.

29—417; 72—106